even though the contents 20a
United States Patent Office 2,968,927
Patented Jan. 24, 1961

2,968,927
HYDRAULIC SYSTEM FOR AN INDUSTRIAL TRUCK

George F. Quayle, Philadelphia, Pa., assignor to The Yale and Towne Manufacturing Company, Stamford, Conn., a corporation of Connecticut Filed Jan. 28, 1960, Ser. No. 5,286

9 Claims. (Cl. 60—97)

This invention relates to a hydraulic system for an industrial truck incorporating a pump and an electric pump motor for providing fluid under pressure for actuating a power steering ram and for actuating load manipulating rams, such as load lifting rams and mast tilting rams, provided on such a truck.

The present invention provides a hydraulic system which will furnish a sufficient supply of fluid under pressure for proper operation of a steering ram and one or more load manipulating rams with minimum operation of the pump motor and minimum stopping and starting of the pump motor. The system of the invention, accordingly, eliminates the heavy drain on the truck battery which would occur if the pump motor were operated continuously. The system also materially reduces the wear on the motor, particularly on the brushes and the commutator of the motor, which would occur if the pump motor were continuously started and stopped in accordance with the instantaneous fluid pressure requirements of the power steering ram during steering of the truck.

In accordance with the invention, the load manipulating rams are operated directly from the pump by operation of the pump motor each time that it is desired to operate a load manipulating ram. The power steering ram is operated from a fluid pressure accumulator. The accumulator is charged by continued operation of the pump motor after each operation of a load manipulating ram. Thus, it is normally not necessary for the pump motor to be started merely for the purpose of charging the accumulator, and the number of times that the pump motor must be started and stopped in supplying fluid under pressure for the steering ram and the load manipulating rams is materially reduced with a resulting increase in the service life of the pump motor.

In the event that the load manipulating rams are not operated with sufficient frequency to keep the accumulator charged, control means are provided to start the pump motor to charge the accumulator when the accumulator becomes substantially discharged.

Figure 1:
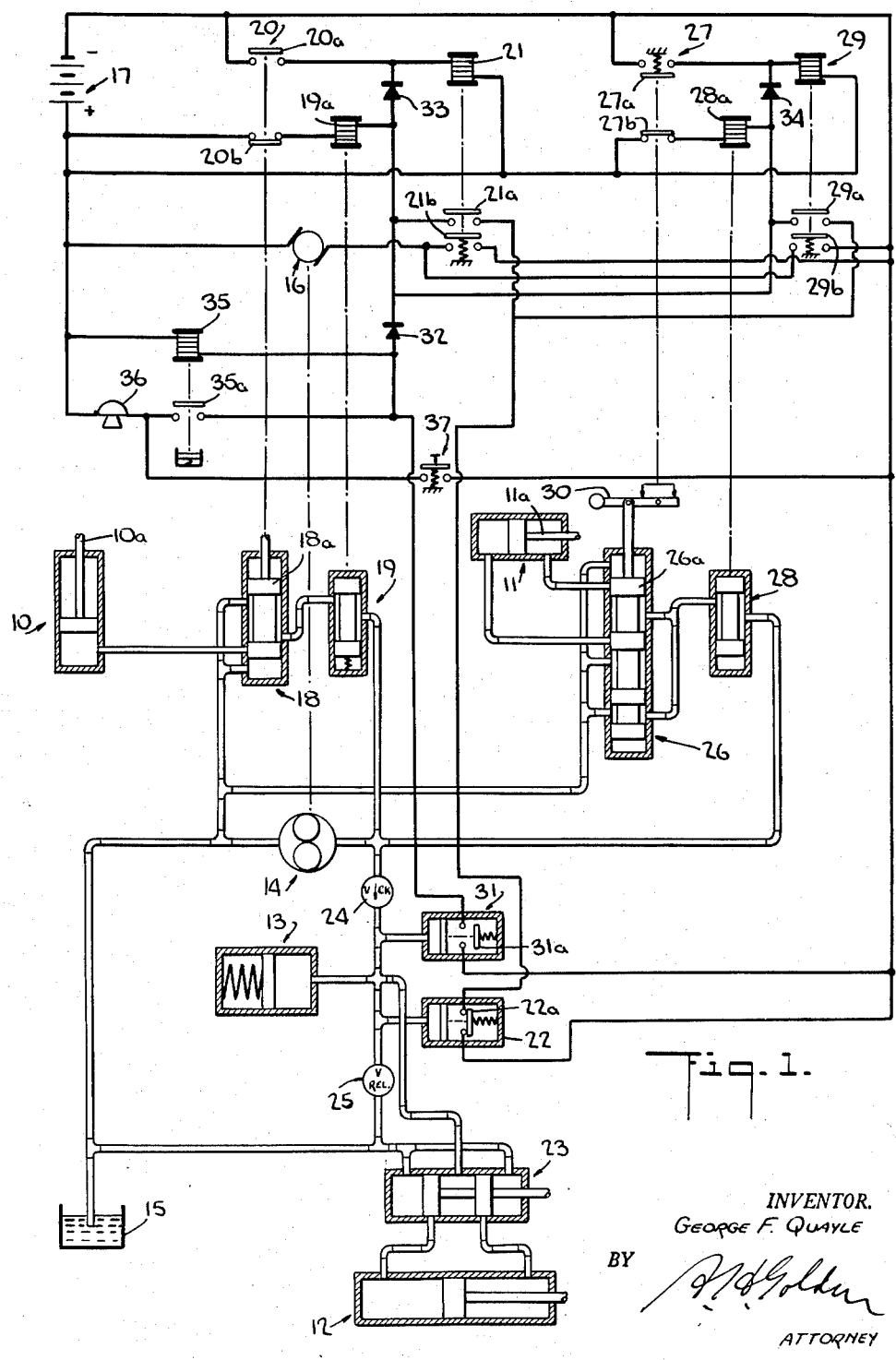
Figure 2:
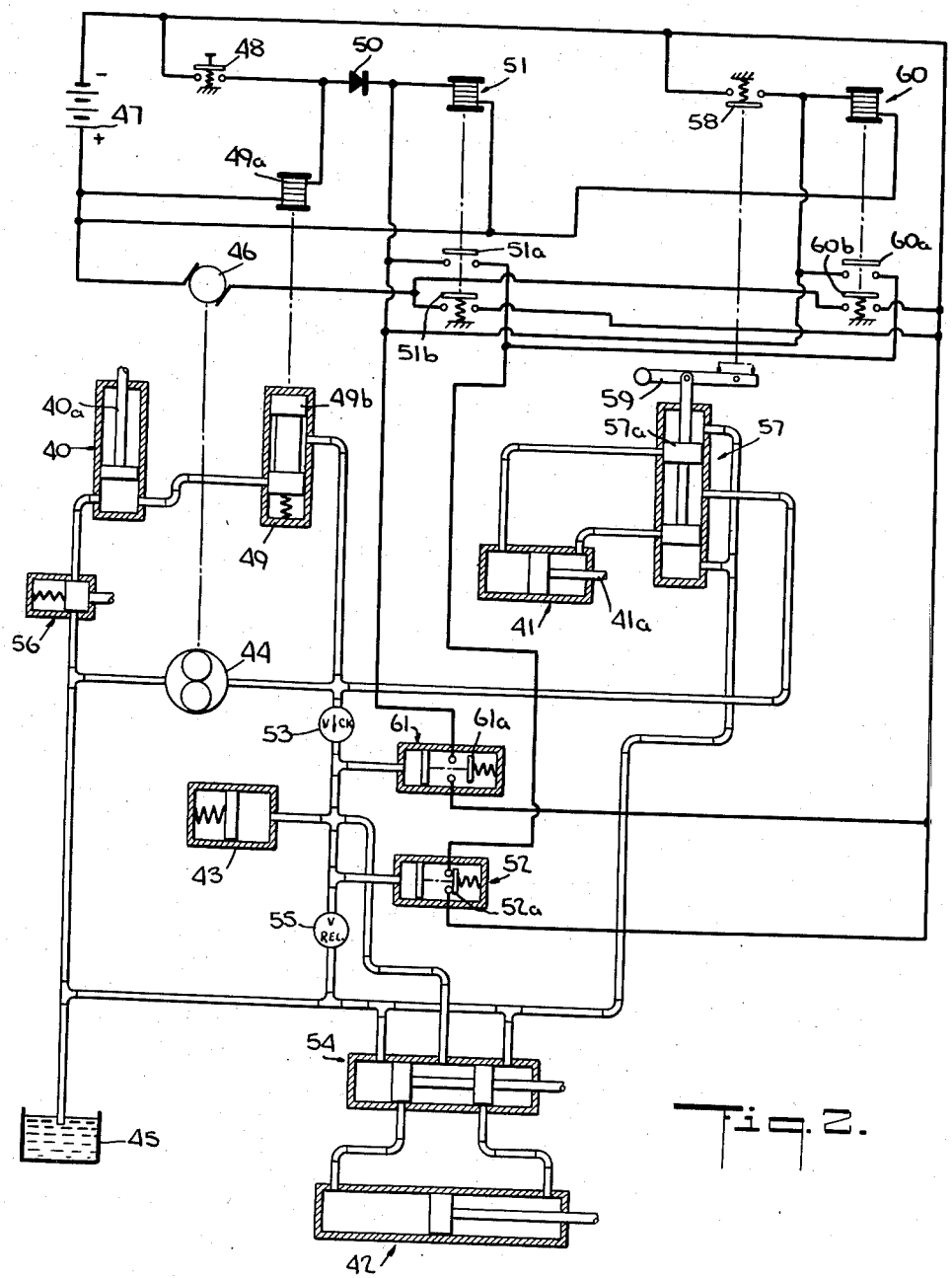

The invention having been broadly described, a more detailed description of the invention is given hereafter with reference to the accompanying drawings wherein:

Fig. 1 is a combined electrical and hydraulic diagram illustrating one form of the invention, and Fig. 2 is a combined electrical and hydraulic diagram illustrating a slightly different form of the invention.

Referring to Fig. 1, a lift ram is indicated at 10, a tilt ram at 11, a steering ram at 12, an accumulator at 13, a pump at 14, a reservoir or sump at 15, an electric motor at 16 for driving pump 14, and a battery at 17.

It will be appreciated that the lift ram of an industrial truck is used to lift the vertically movable uprights and the load carriage of such a truck to elevate or otherwise manipulate a load carried by the load carriage. The tilt ram is used to tilt the uprights a few degrees rearwardly to improve the stability of the truck and of a load carried by the load carriage. The power steering ram is operatively connected to the steerable ground wheel or wheels of the truck and is used to steer the wheels in response to actuation of a control member by the operator, so as to reduce the manual effort necessary to steer the truck.

While the invention is described hereafter in conjunction with a lift ram and a tilt ram it will be appreciated that the invention may be used in conjunction with other load manipulating rams commonly provided on industrial trucks, such as for example, load clamping rams, load carriage rotating rams, and load carriage extending and retracting rams.

In the diagram of Fig. 1 all solenoids are shown in non-energized condition and all valves are shown in their normal or non-actuated condition. The accumulator 13 is shown in a partially charged condition and a low pressure switch 31 associated therewith is shown in an open, actuated condition. The accumulator 13 may be of any desired conventional type, and may incorporate either a spring or a compressible gas, such as nitrogen, as the energy storing medium.

In order to operate the lift ram 10, the operator shifts the slide 18a of a valve 18 in the vertically downward direction, as viewed in Fig. 1, to complete a fluid circuit from the pump 14 to the lower side of the lift ram 10 through a normally open, soleniod operated valve 19. A switch 20 is operatively connected to the slide 18a, or actuated by the same controller as the valve 18, so that the switch 20 is actuated substantially simultaneously with the operation of the valve 18 to close the normally open contacts 20a thereof and to open normally closed contacts 20b.

The opening of contacts 20b prevents energization of a solenoid 19a of the valve 19 to insure that the valve 19 remains open. The closing of contacts 20a completes a circuit to energize a motor control relay 21 so that normally open contacts 21a and 21b thereof are closed.

As will be described in detailed hereafter, the closing of contacts 21a completes a holding circuit to hold motor control relay 21 energized when contacts 20a are subsequently opened. The closing of contacts 21b completes a circuit to the pump motor 16 to start operation thereof to drive pump 14 whererby fluid under pressure is supplied to the lower side of the lift ram 10 through valve 19 and valve 18 to extend the piston rod 10a of the lift ram 10.

Operation of the lift ram 10 is stopped by shifting slide 18a of valve 18 back again to the center position as shown in Fig. 1. Lift ram 10 may be lowered by shifting the slide 18a of valve 18 to the uppermost position, as viewed in Fig. 1, so that the lower side of the ram 10 is connected to the sump 15.

When the slide 18a is shifted to the center position, or to the uppermost position, the switch 20 is released so that contacts 20a open and contacts 20b close. If, however, the accumulator 13 is not fully charged, the pump motor 16 continues to operate and drive the pump 14 to charge the accumulator 13, even though the contacts 20a are open, because the previous closing of contacts 21a of motor control relay 21 completed a holding circuit through closed contacts 22a of a high pressure switch 22 to hold motor control relay 21 energized and contacts 21b closed when the contacts 20a are subsequently opened. In this manner, the motor 16 continues to operate after each operation of the lift ram 10 to drive the pump 14 until the accumulator 13 is fully charged. Fluid under pressure for operating the steering ram 12 is drawn from the accumulator 13 and is admitted to the steering ram 12 through a conventional directional valve 23. Fluid under pressure is directed from the pump 14 to the accumulator 13 through a check valve 24.

When the contacts 20b are closed after the operation of the lift ram 10, a circuit is completed through contacts 21a of relay 21 and contacts 22a of pressure switch 22 to energize solenoid 19a of valve 19 to close valve 19. The closing of valve 19 prevents the flow of fluid from the pump 14 through valve 18 back to the sump 15 when the slide 18a of the valve 18 is in the center position, so that the fluid under pressure from the pump 14 will flow through the check valve 24 to the accumulator 13 to charge the accumulator.

When the accumulator 13 becomes completely charged, the increased pressure in the accumulator actuates the high pressure switch 22 to open the contacts 22a. The opening of contacts 22a breaks the circuit to motor control relay and solenoid 19a to stop operation of the pump motor 16 and to open the valve 19.

A pressure relief valve 25 connecting the accumulator 13 with the sump 15 prevents the pressure on the system from becoming excessive.

The tilt ram 11 is operated in a similar manner by the simultaneous shifting of a slide 26a of a valve 26 to the lowermost position, as viewed in Fig. 1, and actuating a switch 27 to close the normally open contacts 27a and to open the normally closed contacts 27b.

The shifting of the slide 26a of the valve 26 to the lowermost position completes a fluid circuit from the pump 14 to the left hand side of the tilt ram 11 through a normally open, solenoid operated valve 28 and completes a circuit from the left hand side of the tilt ram to the sump 15. Opening of contacts 27b prevents energization of solenoid 28a of valve 28 to insure that valve 28 remains open. Closing of contacts 27a completes a circuit to energize a motor control relay 29 so that normally open contacts 29a and 29b thereof are closed.

As will be described in detail hereafter, the closing of the contacts 29a completes a holding circuit for holding motor control relay 29 energized when contacts 27a are subsequently opened. The closing of contacts 29b completes a circuit to pump motor 16 to start operation thereof to drive pump 14 whereby fluid under pressure is supplied to the left hand side of the tilt ram 11 to extend the piston rod 11a.

Operation of the tilt ram 11 is stopped by shifting the slide 26a to the center position, as shown in Fig. 1. At the same time that slide 26a is shifted to center position, the switch 27 is released so that contacts 27a open and contacts 27b close. If, however, the accumulator 13 is not fully charged, the pump motor 16 continues to operate to drive the pump 14 to charge the accumulator 13, even after contacts 27a open, because the previous closing of contacts 29a completed a holding circuit through closed contacts 22a of the high pressure switch 22 to hold motor control relay 29 energized and contacts 29b closed when the contacts 27a are subsequently opened. Thus in this manner the pump motor 16 continues to operate to drive the pump 14 after each operation of the ram 11 until the accumulator 13 is fully charged. When the accumulator 11 becomes fully charged the contacts 22a of the pressure switch 22 open and break the circuit to motor control relay 29, so that contacts 29b open to stop operation of pump motor 16.

When the switch 27 is released as the slide 26a is shifted to the center position, contacts 27b close and complete a circuit through closed contacts 29a of motor control relay 29 and contacts 22a of pressure switch 22 to energize solenoid 28a to close valve 28. The closing of valve 28 prevents the flow of fluid from the pump 14 to the sump 15 through valve 26 when the slide 26a is in a centered position, so that the fluid under pressure will flow from pump 14 to the accumulator 13 through check valve 24 to charge the accumulator 13.

As there is no force acting on the piston rod 11a of the tilt ram 11 tending to retract the piston rod, as is the case with the lift ram 10 in which the weight of the load carriage and uprights of the truck retracts the piston rod, the piston rod 11a must be retracted by fluid pressure. To accomplish this, the operator shifts the slide 26a of the valve 26 to the uppermost position, as viewed in Fig. 1, to complete a fluid circuit between the pump 14 and the right hand side of the tilt ram 11 through the normally open valve 28, and to complete a fluid circuit between the left hand side of the tilt ram 11 and the sump 15. At the same time switch 27 is actuated to close contacts 27a and open contacts 27b to start operation of the pump motor 16 to drive the pump 14 whereby fluid under pressure is supplied to the tilt ram 11 to retract the piston rod 11a. The switch 27 is operatively connected to the slide 26a by suitable means, such as indicated diagrammatically by the pivoted operating lever 30, so that the switch 27 is actuated when the slide 26a of the valve 26 is moved in either direction from the center position, as shown in Fig. 1.

To stop the retractive movement of the piston rod 11a, the slide 26a of the valve 26 is again shifted to the center position and the switch 27 again released. If the accumulator 13 is not fully charged the motor 16 continues to operate to drive the pump 14 until the accumulator 13 is fully charged in the manner as previously described.

It can be seen that by the arrangement shown in Fig. 1, motor 16 continues to operate and drive the pump 14 to fully charge the accumulator 13 after each operation of either the lift ram 10 or the tilt ram 11. The steering ram 12 is operated by fluid under pressure from the accumulator 13 and during normal operation the lift ram 10 and tilt ram 11 will be operated with sufficient frequency to maintain the accumulator 13 charged without operation of the pump motor 16 at other times. Thus, by this arrangement there is minimum stopping and starting of the pump motor with a resulting extension of the service life of the motor.

There may, however, be instances when the rams 10 and 11 are not operated with sufficient frequency to maintain the accumulator 13 charged. To take care of such a situation, the arrangement as shown in Fig. 1 includes a low pressure switch 31 which is released to close the contacts 31a thereof if the accumulator becomes substantially discharged. Closing of contacts 31a completes a circuit through rectifiers 32 and 33 to energize the motor control relay 21 and completes a circuit through rectifiers 32 and 34 to energize motor control relay 29 to start operation of the motor 16 to drive the pump 14 so that the accumulator 13 is charged. As soon as charging of the accumulator 13 begins, the pressure increases and the low pressure switch 31 is again actuated to open contacts 31a. The motor control relays 21 and 29, however, remain energized because the closing of contacts 21a and 29a formed holding circuits through closed contacts 22a of high pressure switch 22. The motor 16 continues to operate until the accumulator 13 is fully charged and high pressure switch 22 is actuated to open contacts 22a and break the holding circuits to motor control relays 21 and 29, so that contacts 21b and 29b open to stop operation of motor 16.

Closing of contacts 31a also completes a circuit to energize a time delay relay 35 to close contacts 35a thereof after a time delay. If charging of the accumulator does not begin within the time delay, contacts 35a close to complete a circuit to a horn 36 to sound the horn 36. This warns the operator that the accumulator 13 is substantially discharged is not being recharged. The horn may be normally operated by push button 37. If the system is operating normally and charging of the accumulator begins within the time delay, the contacts 31a of the low pressure switch 31 will be opened by the pressure in the accumulator so that the circuit to solenoid 35 is broken and contacts 35a do not close to sound horn 36. Other types of warning arrangements can, of course, be provided. For example, a visible light can be used in place of the horn, or the circuit may be connected into the circuit for the traction motor of the truck, so that the truck stops if the accumulator becomes discharged and is not recharged.

Referring to Fig. 2, there is shown a combined electrical and hydraulic diagram, illustrating a slightly different form of the invention from that shown in Fig. 1.

In Fig. 2, the lift ram is indicated at 40, the tilt ram at 41, the steering ram at 42, the accumulator at 43, the pump at 44, the reservoir or sump at 45, the pump motor at 46 and the battery at 47.

In the diagram of Fig. 2, all solenoids are shown in non-energized condition and all valves in their normal or non-actuated positions. The accumulator 43 is shown in a partially discharged condition, and a low pressure switch 61, associated with the accumulator is shown in an open actuated condition. The accumulator 43, like the accumulator 13 in Fig. 1, may be of any desired conventional type, and may incorporate a spring or a compressible gas, such as nitrogen, as the energy-storing medium.

In order to operate the lift ram 40, the operator presses a push button switch 48 to close the contacts thereof. Closing the switch 48 completes a circuit to energize a solenoid 49a of a normally closed solenoid operated valve 49 to shift the slide 49b thereof to open position. This completes a fluid circuit between pump 44 and lift ram 40.

At the same time, the closing of switch 48 completes a circuit through a rectifier 50 to energize a motor control relay 51 to close normally open contacts 51a and 51b. Closing contacts 51b completes a circuit to pump motor 46 to start operation thereof to drive pump 44 so that fluid under pressure is supplied to the lift ram 40 through valve 49 to extend the piston rod 40a.

Operation of the lift ram 40 may be stopped by releasing push button switch 48 to open the contacts thereof. Releasing the switch 48 breaks the circuit to solenoid 49a so that the slide 49b of valve 49 shifts to closed position to cut off flow of fluid under pressure from pump 44 to the lift ram 40. If, however, the accumulator 43 is not fully charged when the switch 48 is released, the pump motor 46 continues to operate to drive pump 44 so as to charge the accumulator 43, because the previous closing of contacts 51a of the motor control relay 51 completed a holding circuit through closed contacts 52a of a high pressure switch 52 to hold the motor control relay 51 energized. Fluid under pressure is supplied from the pump 44 to the accumulator 43 through a check valve 53.

Motor 46 continues to drive pump 44 until the accumulator 43 becomes fully charged and the high pressure switch 52 is actuated to open contacts 52a by the increased pressure in the charged accumulator. The opening of contacts 52a breaks the holding circuit to the motor control relay 51, so that contacts 51b open to stop operation of the pump motor 46. In this manner, the accumulator 43 is charged after each operation of the lift ram 40 by continued operation of the pump motor 46. The charged accumulator 43 provides a supply of fluid under pressure for operating the steering ram 42 so that the pump motor 46 does not have to be operated each time that the steering ram is operated. Fluid under pressure from the accumulator 43 is admitted to the steering ram 42 by means of a conventional directional valve 54. A pressure relief valve 55 connects the accumulator 43 with the sump 45 and prevents the pressure in the system from becoming excessive.

The piston rod 40a of the lift ram 40 may be lowered by operating a dumping valve 56 to connect the ram 40 with the sump 45.

To operate the tilt ram 41, the operator shifts the slide 57a of a directional valve 57 in the desired direction. At the same time a switch 58 is closed. The switch 58 is operatively connected to the slide 57a, as indicated diagrammatically by the operating lever 59, so that the switch 58 is closed whenever the slide 57a is shifted from the center position, as shown in Fig. 2.

The shifting of the slide 57a in one direction or the other from the center position completes a fluid circuit between the pump 44 and one side of the tilt ram 41, and between the sump 45 and the other side of the tilt ram 41.

The closing of switch 58 completes a circuit to energize a motor control relay 60 to close normally open contacts 60a and 60b. As will be described in detail hereafter, the closing of contact 60a completes a holding circuit to hold the relay 60 energized when the switch 58 is released. The closing of contact 60b completes a circuit to start operation of the pump motor 46 to drive pump 44, so as to supply fluid under pressure to the tilt ram 41 through the directional valve 57 to extend or retract the piston rod 41a depending on the direction in which the slide 57a of valve 57 is shifted.

Operation of the tilt ram may be stopped by shifting the slide 51a of valve 57 to the center position to cut off the flow of fluid to or from the tilt ram 41. At the same time switch 58 is opened. If, however, the accumulator 43 is not fully charged at this time, the pump motor 46 continues to operate to drive pump 44 and charge the accumulator 43 because the previous closing of contact 60a of motor control relay 60 completed a holding circuit through closed contacts 52a of the high pressure switch 52 to hold motor control relay 60 energized. The motor 46 continues to operate until the accumulator 43 becomes fully charged and contacts 52a of the high pressure switch 52 are opened by the increased pressure in the accumulator 43 when the accumulator is fully charged.

It can be seen that by the arrangement as shown in Fig. 2, the motor 46 continues to operate to drive the pump 44 so as to fully charge the accumulator 43 after each operation of either the lift ram 40 or the tilt ram 41. The steering motor 42 is operated by fluid under pressure from the accumulator 43 and during normal operation the lift ram and tilt ram will be operated with sufficient frequency to maintain the accumulator 43 in a charged condition without operation of the pump motor 46 at other times.

If for any reason the lift ram 40 and tilt ram 41 are not operated with sufficient frequency to maintain the accumulator 43 charged, and the accumulator 43 becomes substantially discharged, a low pressure switch 61 is released to close contacts 61a. The closing of contacts 61a completes a circuit to energize both motor control relays 51 and 60 to close contacts 51a and 51b and contacts 60a and 60b. The closing of contacts 51b and 60b complete circuits to motor 46 to start operation of the motor to drive pump 44 and charge the accumulator 43. As soon as charging of the accumulator 43 begins, the pressure increases and the switch 61 is again actuated to open contacts 61a. The motor control relays 51 and 60, however, remain energized to keep the pump motor 46 operating because the previous closing of contacts 51a and 60a completed holding circuits through closed contacts 52a of high pressure switch 52. When the accumulator 43 becomes fully charged the high pressure switch 52 is actuated by the increased pressure in the charged accumulator to open contacts 52a. The opening of contacts 52a breaks the circuits to the motor control relays 51 and 60 so that contacts 51b and 60b open to stop operation of the motor 46.

While no arrangement for warning the operator that the accumulator is discharged and is not being charged is shown in conjunction with the circuit shown in Fig. 2, it will be appreciated that a warning arrangement similar to that shown in Fig. 1 can be included in the circuit shown in Fig. 2.

From the preceding description it can be seen that there is provided a novel hydraulic system for an industrial truck which provides a sufficient supply of fluid under pressure for proper operation of a power steering ram and one or more load manipulating rams with minimum operation and minimum starting and stopping of the pump motor.

While two embodiments of the invention have been shown and described, it will be appreciated that this is for the purpose of illustration and that changes and modifications may be made therein without departing from the spirit and scope of the invention.

I now claim:

1. In a truck of the class described, a fluid pump, pump actuating means, a load manipulating ram, a power steering ram, an accumulator for supplying fluid under pressure to said power steering ram, control means operable to effect operation of said pump actuating means and to direct fluid under pressure from said pump to said load manipulating ram to operate said load manipulating ram, and means continuing operation of said pump actuating means to charge said accumulator after said control means are operated to stop operation of said load manipulating ram, whereby said accumulator is charged after each operation of said load manipulating ram.

2. In a truck of the class described, a fluid pump, pump actuating means, a load manipulating ram, a power steering ram, an accumulator for supplying fluid under pressure to said power steering ram, control means operable to effect operation of said pump actuating means, a valve for directing fluid under pressure from said pump to said load manipulating ram to operate said load manipulating ram, and means continuing operation of said pump actuating means to charge said accumulator after said control means and said valve are operated to stop operation of said load manipulating ram, whereby said accumulator is charged after each operation of said load manipulating ram.

3. In a truck of the class described, a fluid pump, pump actuating means, a load manipulating ram, a power steering ram, an accumulator for supplying fluid under pressure to said power steering ram, control means operable to effect operation of said pump actuating means, a valve operatively connected to said control means for directing fluid under pressure from said pump to said load manipulating ram to operate said load manipulating ram when said control means are operated, and means continuing operation of said pump actuating means to charge said accumulator after said control means and said valve are operated to stop operation of said load manipulating ram, whereby said accumulator is charged after each operation of said load manipulating ram.

4. In a truck of the class described, a fluid pump, an electric motor for driving said pump, a load manipulating ram, a power steering ram, an accumulator for supplying fluid under pressure to said power steering ram, a switch operable to effect operation of said electric motor, a valve operatively connected with said switch for directing fluid under pressure from said pump to said load manipulating ram to operate said load manipulating ram when said switch is operated, and means continuing operation of said motor to charge said accumulator after said switch and valve are operated to stop operation of said load manipulating ram, whereby said accumulator is charged after each operation of said load manipulating ram.

5. In a truck of the class described, a fluid pump, an electric motor for driving said pump, a load manipulating ram, a power steering ram, an accumulator for supplying fluid under pressure to said power steering ram, a switch operable to effect operation of said electric motor, a valve operatively connected with said switch for directing fluid under pressure from said pump to said load manipulating ram to operate said load manipulating ram when said switch is operated, and a holding circuit continuing operation of said electric motor to charge said accumulator after said switch and valve are operated to stop operation of said load manipulating ram, whereby said accumulator is charged after each operation of said load manipulating ram.

6. In a truck of the class described, a fluid pump, an electric motor for driving said pump, a load manipulating ram, a power steering ram, an accumulator for supplying fluid under pressure to said power steering ram, a switch operable to effect operation of said electric motor, a valve operatively connected with said switch for directing fluid under pressure from said pump to said load manipulating ram to operate said load manipulating ram when said switch is operated, means continuing operation of said electric motor to charge said accumulator after said switch and valve are operated to stop operation of said load manipulating ram, whereby said accumulator is charged after each operation of said load manipulating ram, and means for stopping operation of said electric motor when said accumulator is fully charged.

7. In a truck of the class described, a fluid pump, pump actuating means, a load manipulating ram, a power steering ram, an accumulator for supplying fluid under pressure to said power steering ram, control means operable to effect operation of said pump actuating means and to direct fluid under pressure from said pump to said load manipulating ram to operate said load manipulating ram, means continuing operation of said pump actuating means to charge said accumulator after said control means are operated to stop operation of said load manipulating ram, whereby said accumulator is charged after each operation of said load manipulating ram, and means for stopping operation of said pump actuating means when said accumulator is fully charged.

8. In a truck of the class described, a fluid pump, pump actuating means, a load manipulating ram, a power steering ram, an accumulator for supplying fluid under pressure to said power steering ram, control means operable to effect operation of said pump actuating means and to direct fluid under pressure from said pump to said load manipulating ram to operate said load manipulating ram, means continuing operation of said pump actuating means to charge said accumulator after said control means are operated to stop operation of said load manipulating ram, whereby said accumulator is charged after each operation of said load manipulating ram, means for stopping operation of said pump actuating means when said accumulator is fully charged, and means effecting operation of said pump actuating means to charge said accumulator if said accumulator becomes discharged before operation of said load manipulating ram is initiated and stopped.

9. In a truck of the class described, a fluid pump, pump actuating means, a load manipulating ram, a power steering ram, an accumulator for supplying fluid under pressure to said power steering ram, control means operable to effect operation of said pump actuating means and to direct fluid under pressure from said pump to said load manipulating ram to operate said load manipulating ram, means continuing operation of said pump actuating means to charge said accumulator after said control means are operated to stop operation of said load manipulating ram, whereby said accumulator is charged after each operation of said load manipulating ram, means for stopping operation of said pump actuating means when said accumulator is fully charged, means effecting operation of said pump actuating means to charge said accumulator if said accumulator becomes discharged before operation of said load manipulating ram is initiated and stopped, and warning means operable when said accumulator becomes substantially discharged and charging of said accumulator does not start within a short period.

No references cited.